United States Patent
Lacaille

(10) Patent No.: US 10,281,360 B2
(45) Date of Patent: May 7, 2019

(54) METHOD AND SYSTEM FOR THE VIBRATION ANALYSIS OF AN ENGINE

(71) Applicant: Safran Aircraft Engines, Paris (FR)

(72) Inventor: Jerome Lacaille, Rosny Sous Bois (FR)

(73) Assignee: Safran Aircraft Engines, Paris (FR)

( * ) Notice: Subject to any disclaimer, the term of this patent is extended or adjusted under 35 U.S.C. 154(b) by 376 days.

(21) Appl. No.: 14/890,472

(22) PCT Filed: May 20, 2014

(86) PCT No.: PCT/IB2014/001349
§ 371 (c)(1),
(2) Date: Nov. 11, 2015

(87) PCT Pub. No.: WO2014/184657
PCT Pub. Date: Nov. 20, 2014

(65) Prior Publication Data
US 2016/0103038 A1    Apr. 14, 2016

(30) Foreign Application Priority Data

May 17, 2013    (FR) ..................... 13 54483

(51) Int. Cl.
*G01M 15/12* (2006.01)
*G05B 23/02* (2006.01)

(52) U.S. Cl.
CPC ......... *G01M 15/12* (2013.01); *G05B 23/0229* (2013.01)

(58) Field of Classification Search
CPC .... G01M 15/12; G01M 15/14; G05B 23/0229
(Continued)

(56) References Cited

U.S. PATENT DOCUMENTS

| | | | |
|---|---|---|---|
| 7,027,909 B2* | 4/2006 | deBotton et al. ..... | G01M 15/12 701/111 |
| 2005/0096873 A1* | 5/2005 | Klein .................... | G01H 1/006 702/184 |

(Continued)

FOREIGN PATENT DOCUMENTS

FR    2 939 924 A1    6/2010

OTHER PUBLICATIONS

Authors: Tianyi Wang and Subrat Nanda, Title: A Tutorial on Feature Extraction Methods, Date: Sep. 24, 2012, Publisher: phmSociety, pp. 41.*

(Continued)

*Primary Examiner* — Lisa M Caputo
*Assistant Examiner* — Roger G Hernandez-Prewitt
(74) *Attorney, Agent, or Firm* — Oblon, McClelland, Maier & Neustadt, L.L.P.

(57) ABSTRACT

A method and a system for the vibration analysis of an engine, including acquiring vibration signals relating to the engine and in order to form at least one spectrogram that represents an operating state of the engine, selecting at least one zone of interest in at least one spectrogram, comparing each zone of interest with a set of corresponding comparison zones belonging to annotated spectrograms recorded in a reference database, and determining a subset of comparison zones that have vibration behaviors similar to those of the zone of interest, and displaying the subset of comparison zones and annotations associated with the subset of comparison zones.

10 Claims, 4 Drawing Sheets

(58) Field of Classification Search
USPC .............................. 73/114.07; 707/705, 713
See application file for complete search history.

(56) References Cited

U.S. PATENT DOCUMENTS

| | | |
|---|---|---|
| 2011/0307220 A1 | 12/2011 | Lacaille |
| 2012/0323531 A1* | 12/2012 | Pascu et al. ........ G01M 13/028 |
| | | 702/184 |
| 2015/0287249 A1 | 10/2015 | Lacaille et al. |

OTHER PUBLICATIONS

Jackson et al., "An Architecture for Distributed Search and Data-Mining in Condition Monitoring Applications," IEEE, XP031214372, (2007), pp. 1-12.
Fletchere et al., "The Signal Data Explorer: A High Performance Grid based Signal Search Tool for use in Distributed Diagnostic Applications," IEEE, XP032120658, (2006), Total 8 Pages.
Clifton et al., "Bayesian Extreme Value Statistics for Novelty Detection in Gas-Turbine Engines," IEEE, (2008), pp. 1-11.
Hazan et al., "Probablistic cutlier detection in vibration spectra with small learning dataset," Mechanical Systems and Signal Processing, (Mar. 28, 2012), Total 21 Pages.
Klein et al., "Methods for diagnostics of bearings in non-stationary environments," The International Journal of Condition Monitoring, vol. 2, No. 1, (Mar. 2012), Total 6 Pages.
International Search Report dated Sep. 22, 2014 in PCT/IB14/001349 Filed May 20, 2014, pp. 3.
French Search Report dated Apr. 17, 2014 in Application No. FR 1354483 Filed May 17, 2013, pp. 1.

* cited by examiner

METHOD AND SYSTEM FOR THE VIBRATION ANALYSIS OF AN ENGINE

FIELD OF THE INVENTION

This invention relates to the field of engine monitoring. In particular, the invention relates to a method and a system for the vibration analysis of an engine in order to detect anomalies or predict the behaviour of the engine.

An engine is subjected to mechanical stresses which can result in the wear and tear of its elements. An effective way to monitor the condition of an engine or its future behaviour is to measure its vibration signature which represents one of the fundamental characteristics of the engine.

More particularly, in the case of an aircraft engine, vibration sensors of the accelerometer type are used in order to measure the vibrations emitted by the engine. However, the vibration signature of the engine is very difficult to obtain as it comes from accelerometric and tachometric measurements acquired at a very high frequency (of a magnitude of 50 kHz). Such measurements cannot be transmitted to the ground for a detailed analysis and the algorithms currently onboard seek only known models and are not validated on operations in actual operation. It often occurs that such algorithms appear to be ineffective as the conditions for acquiring data are not those that were hoped for when the algorithm was designed. Moreover, the implementing of an algorithm on an onboard calculator of an engine in a complex and expensive process, and such the tendency is to construct general algorithms that calibrate themselves on a family of engines and are not suited to a specific engine. Furthermore, the onboard calculators are not currently able to adapt an algorithm on the fly, and the certification processes for such intelligent tools are not yet defined.

On the other hand, any new engine, coming off the assembly line passes a reception test on a test bench. The vibrations of the engine are measured, for two separate operating phases. Indeed, the signals are acquired using two accelerometers during an acceleration phase of the engine, then a deceleration phase. Each context is studied by the intermediary of two channels and a spectral image (spectrogram) is then calculated for each vibration signal. A spectrogram characterises the energy of the signal for a given vibration frequency and a rotating speed of the shaft. The speed of rotation is defined by indicators noted as N1 and N2 which respectively measure the speed of rotation of the low pressure shaft and the speed of rotation of the high pressure shaft. It is also possible to show the data in the form of spectrograms in the domain of orders (i.e., when time is replaced with the number of rotations of a shaft). After each test bench, an engine is as such characterised by several spectrograms that correspond to the various operational contexts studied.

Currently, the experts analysing vibrations, visually examine each spectrogram for the purpose of detecting energy anomalies of the engine. Often the interesting signature appears within one or several small windows extracted from all of these graphics representations. It is also possible to add to it context information coming from the operation of the engine, such as the speed of rotation of the shafts, temperatures, pressure, and the flow of fuel as well as descriptive information on the state of the engine: position of the valves, geometry of the stators, etc.

The analysis of the experts is based on their professional experience, but also on feedback from the analysis of all of the spectrograms already determined for comparable engines, available in a reference database. For example, during the study of a given spectrogram, a zone may appear to the expert as being atypical and therefore deemed as suspicious because it is highly unlikely. If it appears that the atypical zone has already been observed in another engine test of the reference database, the singularity observed is no longer labelled as suspicious. The expert can finally place a label on the data for future uses.

The work of the comparison is complex, meticulous and strongly linked to the analysis and to its operation experience. One of the difficulties of this work is that it is not possible to define a unique reference spectrogram. Each spectrogram must be implicitly compared with all of the spectrograms already observed.

The object of this invention is consequently to propose a system and a method for the vibration analysis of an engine without having the aforementioned disadvantages and in particular, by implementing a navigation function that allows for fast and easy access to similar vibration behaviours of similar engines in order to benefit from analyses and expertises that have already been carried out beforehand.

OBJECT AND SUMMARY OF THE INVENTION

This invention relates to a method for the vibration analysis of an engine, comprising the following steps:
spectral acquisition of vibration signals relating to the engine in order to form at least one spectrogram that represents an operating state of said engine,
selecting at least one zone of interest in said at least one spectrogram,
comparing each zone of interest with a set of corresponding comparison zones belonging to annotated spectrograms recorded in a reference database, for determining a subset of comparison zones that have vibration behaviours similar to those of said zone of interest, and
recovering said subset of comparison zones and annotations associated with said subset of comparison zones.

The method makes it possible to calculate and to list quickly and automatically for each new engine the vibration behaviours that are most similar to engines that have already been analysed. This method therefore offers a navigation function that allows for access to the data of similar engines in order to benefit from the analyses and expertises carried out previously on similar vibration behaviour. This makes it possible to interpret the spectral images in order to detect anomalies or predict the future behaviour of the engine simply, rapidly and at least cost.

Advantageously, the step of comparison comprises:
the construction for each zone of interest of an interest vector that represents said zone of interest by projecting said zone of interest on an underlying representation space,
the constructing of a set of comparison vectors that represent said set of comparison zones by projecting each of said comparison zones on said representation space,
the calculating of a score of similarity between said vector of interest and each one of said comparison vectors for determining a subset of comparison vectors that have a similarity score that exceeds a predetermined level, and
the selection of said subset of comparison zones associated with said subset of comparison vectors.

The projection of the spectral zones onto a representation space makes it possible to introduce a comparison metric in order to find the comparison zones that are the closest to the zone of interest indicating as such the engines that belong to the reference base of which the behaviour is the closest to the engine studied. This makes it possible to optimise the diagnostic while still rendering it the most objective as possible.

Advantageously, the method comprises the following steps:
- the annotation of said zone of interest, and
- the recording in the reference database of said zone of interest, of the annotation associated with said zone of interest as well as the spectrogram containing said zone of interest.

This makes it possible to enrich and update the reference database.

Advantageously, the projection onto the representation space is carried out according to a projection model or a combination of projection models from among the following models: physical model, model through learning, and mathematical model.

Advantageously, the method comprises a display of a list of said subset of zones of comparison diagnosed as being the closest to the zone of interest.

Advantageously, said list of said subset of comparison zones is sorted in decreasing order of similarity and comprises statistical data and annotations.

Advantageously, the method comprises a step of cleaning of said at least one spectrogram or of said at least one zone of interest by means of a noise removal algorithm.

Advantageously, the noise removal algorithm corresponds to a parametric model of a Gamma law, a statistical model, or a phase shift model.

Advantageously, each comparison zone is comprised in a spectral domain that corresponds to the vicinity of the zone of interest.

According to an embodiment of the invention, the engine is an aircraft engine, and the spectral acquisition of vibration signals is carried out by measuring the vibrations of the engine during the acceleration and deceleration phases according to the low pressure and high pressure speeds of rotation in order to form a set of spectrograms that corresponds to operating contexts of the engine.

The invention also aims for a system for the vibration analysis of an engine, comprising:
- processing means for acquiring vibration signals relating to the engine and in order to form at least one spectrogram that represents an operating state of said engine,
- processing means for selecting at least one zone of interest in said at least one spectrogram,
- processing means for comparing each zone of interest with a set of corresponding comparison zones belonging to annotated spectrograms recorded in a reference database, and for determining a subset of comparison zones that have vibration behaviours similar to those of said zone of interest, and
- output means for displaying said subset of comparison zones and annotations associated with said subset of comparison zones.

BRIEF DESCRIPTION OF THE DRAWINGS

Other particularities and advantages of the device and of the method according to the invention shall appear better when reading the description provided hereinafter, for the purposes of information and in a non-restricted way, in reference to the annexed drawings wherein.

DETAILED DESCRIPTION OF EMBODIMENTS

The principle of the invention consists in implementing a metric adapted to compare a spectral window of an engine to be analysed with spectral windows relating to other engines, contained in a reference database. This makes it possible to make the best use of the reference database and in an automatic manner.

Figure 1:
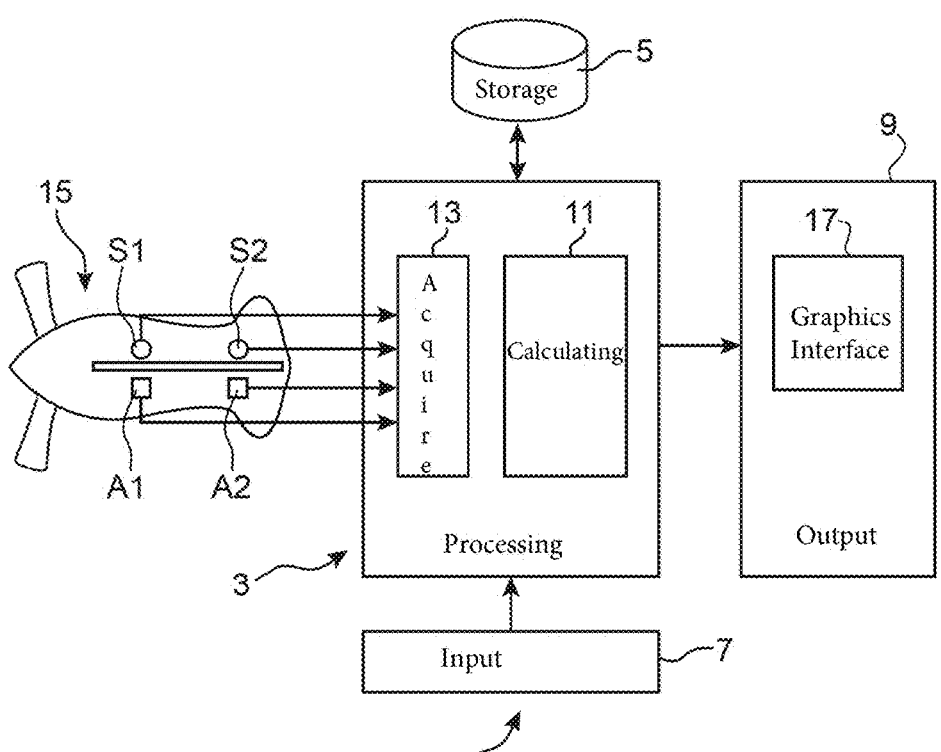
FIG. 1 diagrammatically shows an example of material means implemented in the system or method for the vibration analysis of an engine, according to the invention.

FIG. 1 shows an example of material means implemented in the system or method for the vibration analysis of an engine and more particularly of an aircraft engine, according to the invention.

The system 1 for the vibration analysis comprises processing means 3, storage means 5, input means 7, and output means 9.

The processing means 3 comprises calculating means 11 as well as acquisition means 13 for acquiring signals coming from sensors A1, A2, S1, S2 installed in the engine 15.

Indeed, sensors of vibration, speed, temperatures, pressure, etc. are integrated into the aircraft engine 15 in order to collect over the course of time measurements on variables relating to the engine and its environment.

More particularly, an aircraft engine 15 in operation comprises, in general, two accelerometers A1, A2. A first accelerometer A1 is installed on the low-pressure engine shaft (LP) in order to measure the vibrations relating to low-pressure components and a second accelerometer A2 is installed on the high-pressure engine shaft (HP) in order to measure the vibrations relating to high-pressure components. By way of example, accelerometers have a frequency resolution of 3.125 Hz, a bandwidth exceeding 5 kHz and an acquisition frequency of 51 kHz.

The engine 15 also comprises two phonic wheels S1, S2 in order to respectively measure the current rotation speeds N1 and N2 of the low pressure LP and high pressure HP shafts.

The acquisition means 13 are configured to acquire the vibrations and speeds of rotation of the engine 15 during two separate operational phases. Each phase is broken down into a series of regular intervals in time where the speed of rotation is considered to be constant on each interval.

The calculating means 11 are configured in order to calculate at least one spectral image (or spectrogram) for each vibration signal, that represents the state of operation of the engine 15. The spectrogram is for example displayed on a screen or a graphics interface 17 included in the output means 9.

Figure 2:
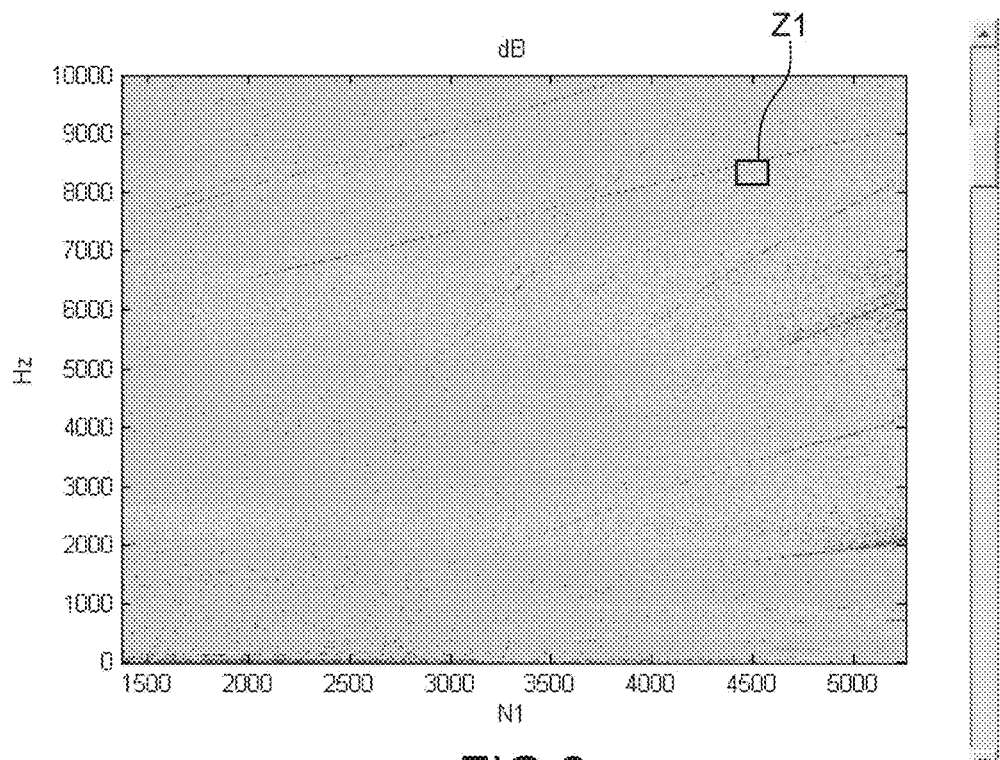
FIG. 2 is an example of a spectrogram that represents a vibration signal during an acceleration phase of the engine.

Indeed, FIG. 2 is a spectrogram of the Campbell diagram type that represents a vibration signal during an acceleration phase.

The x-axis represents the speed of rotation and the y-axis represents the frequency or the order of the rotation shaft. The Campbell diagram characterises the energy of the signal for a vibration frequency and a speed of rotation of the shaft. In general, different colours are used to represent different levels of energies.

As such, the vibration data is automatically viewed on the graphics interface 17 in the form of spectrograms according to modulation modes and predetermined time-frequency representation domains. A domain is a representation of the data in time or in order, with the order being either a number of rotations of a shaft or a virtual order for example based on the difference (or the sum) of the speeds of rotation (N2−N1 or N2+N1) for the study of the inter-shaft bearings.

Moreover, the input means 7 comprise usual tools (for example, mouse, stylus, keyboard, touch-sensitive screen) which are suited to allow for the selection of at least one window or zone of interest Z1.

The zone of interest Z1 is delimited by an interval of frequency and of speed in the spectrogram displayed on the graphics interface 17. It is defined by the type of representation and possibly according to the type of anomaly sought or the type of modulation (harmonics). For example, a window of interest Z1 can be defined on a representation of the time-frequency type by selecting a given frequency or a given speed, considered to be pertinent for monitoring for example a particular part that can wear down faster than the others.

The window of interest Z1 as such corresponds to a time-frequency mask defined graphically over one or several domains. The harmonics can be taken into account automatically by comb masks.

The processing means 3 are configured to compare each zone of interest Z1 selected with a set of corresponding comparison zones that belong to spectrograms that may be annotated and recorded in a reference database stored in the storage means 5. The reference database contains a list of engines and tests, vibration measurements, contextual measurements (temperature, pressure, etc.) and more particularly, annotated spectrograms that correspond to the list of engines. The processing means 3 are configured to search using the zone of interest Z1 selected and a predetermined metric, a subset of comparison zones that have vibration behaviours similar to those of the zone of interest.

The metric makes use of a time-filtering frequency model based on decompositions. Indeed, in order to compare a zone of interest Z1 with a set of comparison zones, the various zones are projected onto a space of reduced dimension provided with a metric. As such, the various zones can be analysed by descriptors which make it possible to calculate pertinent and robust indicators which can then be compared easily using a pertinent metric for the application.

The metric can for example be defined on a representation space or a texture space wherein the spectral zones are projected according to a physical projection model, or an empirical projection model via learning, or a mathematical projection model. Alternatively, the spectral zones can be projected according to a combination of at least two projection models from among the physical, empirical or mathematical projection models.

The physical model is for example predefined by the expert according to a maximum level of energy, a total energy, a distribution of energy, an excess mass indicator, or other indicators.

The model via learning can correspond to a linear regression according to for example a principal component analysis (PCA) which makes it possible to automatically find the space onto which the projection is carried out. Another more advantageous model by learning corresponds to a non-negative matrix factorisation (NMS). This second empirical model is similar to PCA but with only positive linear combinations, and especially the advantage of being able to be interpreted physically by the experts. A "sparse code representation" model can also be used where actual textures extracted from known vibration data are projected.

The mathematical model is for example based on curvelet filters. This model formed of rays and points does not require a learning and in addition has the advantage of being able to be interpreted physically.

As such, when the user intuitively defines a zone of interest Z1 on a graphical representation, the processing means 3 associate with it coefficients in an underlying representation space. These coefficients may possibly correspond to a somewhat different visualisation of the zone that the experienced user can view in order to improve his definition of the zone of interest.

Regardless of the projection model used, the calculating means 11 are configured to project the selected zone of interest Z1 as well as each of the comparison zones onto the underlying representation space in order to build a vector of interest that represents the zone of interest as well as a set of comparison vectors that represents all of the comparison zones. As such, a zone which is constituted of a large number of pixels (for example, 64×64) is replaced with a vector with a more reduced dimension (for example, around ten values) in a representation space. The representation space can be defined according to a referential of descriptive indicators or according to a referential of texture identifiers.

Advantageously, each comparison zone is chosen to be included in a spectral domain that corresponds to the vicinity of the zone of interest. Indeed, it is advantageous to search for a similar zone in a domain that is a little wider than that of the zone of interest in order to take into account a certain flexibility in the configuration as well as slight shifts that can exist between various engines which are not all perfectly identical.

Furthermore, the calculating means 11 are configured to calculate a similarity score between the vector of interest and each one of the comparison vectors for determining a subset of comparison vectors that have a similarity score that exceeds a predetermined level. This allows the processing means 3 to select at least one portion of the subset of comparison zones associated with the subset of comparison vectors.

Advantageously, the processing means 3 display on the graphics interface 17, a list of comparison zones of the reference database diagnosed as being the closest to the zone of interest Z1 studied. The list of comparison zones is advantageously sorted in decreasing order of similarity and comprises statistical data and annotations.

The processing means 3 as such makes it possible to indicate to the user the engines that belong to the reference database for which the behaviour is the closest to that of the engine studies.

Figure 3A:
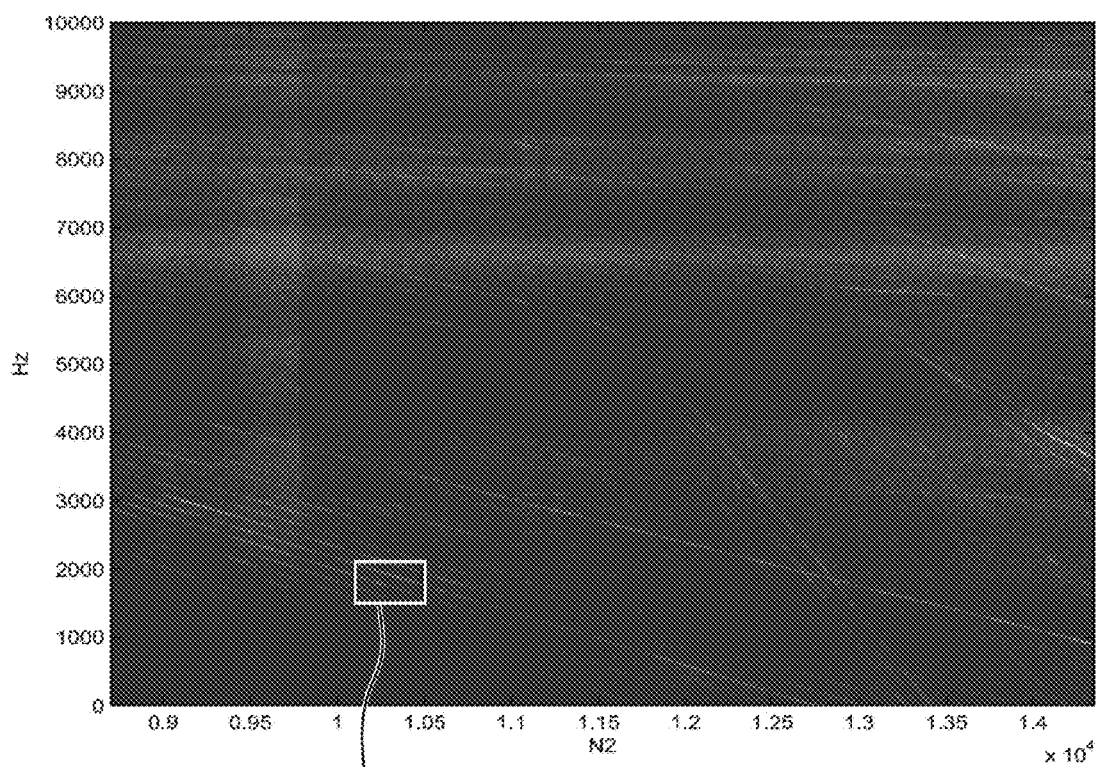
FIGS. 3A-3C show an example of a vibration analysis according to an embodiment of the invention.
Figure 3B:
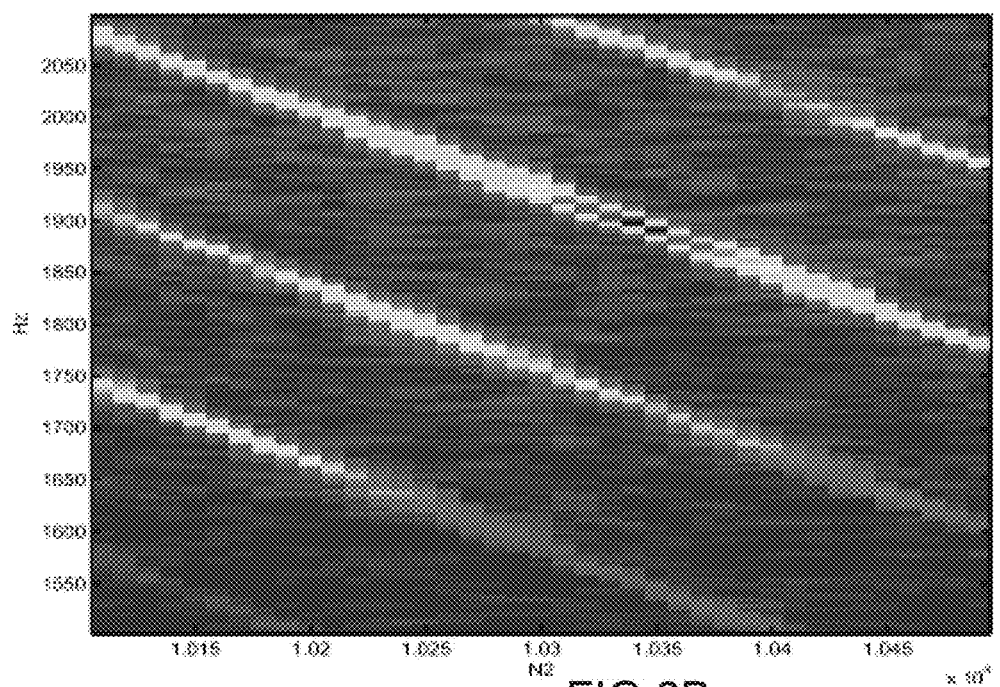
Figure 3C:
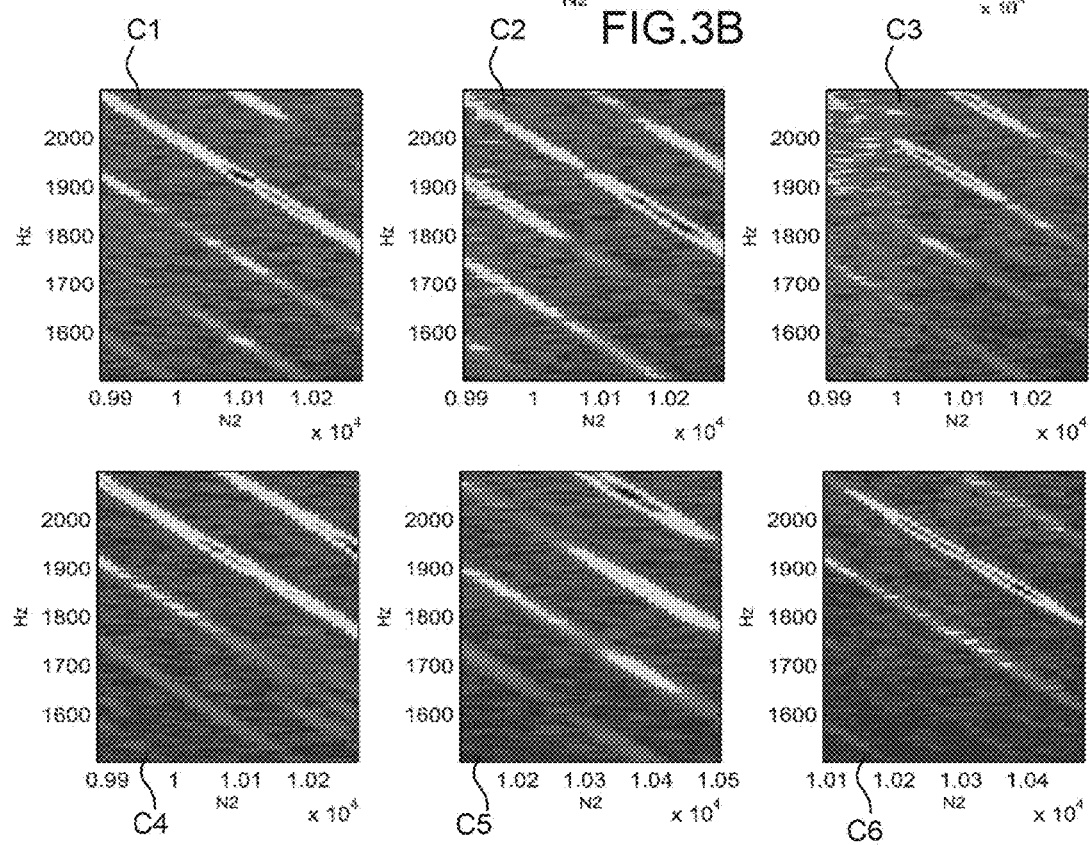

FIGS. 3A-3C show an example of a vibration analysis according to an embodiment of the invention.

FIG. 3A shows a Campbell diagram synchronised on the high-pressure shaft (N2) wherein a zone of interest Z1 has been selected by a user. The user looks for example for specific vibration configurations that correspond to known defects that can appear in this zone of interest. An enlargement (zoom) of the zone of interest Z1 is shown in FIG. 3B.

This example uses the projection model NMS in order to find the comparison zones that are closest to the zone of interest.

Indeed, FIG. 3C shows six small images C1-C6 that show the comparison zones that have the most similarity with the zone of interest Z1.

This list of six comparison zones C1-C6 is displayed on the graphics interface 17 with possibly corresponding annotations that allow the user to take advantage of an analysis conducted previously by an expert on similar vibration behaviour.

The user can also use the input means 7 to provide annotations on the zones of interest studied. Each zone of interest, its associated annotation as well as the spectrogram containing it are advantageously recorded in the reference database in order to enrich and update the reference database. The annotations can be categorised, which then subsequently makes it possible, by studying the labels of similar phenomena appearing on other engines, to obtain a quick overview of what is being observed. Advantageously, a noise removal algorithm can be used to clean the selected zone of interest before looking for the comparison of similar zones. A noise removal algorithm can also be used over the entire spectrogram before selecting the zone of interest. This cleaning makes it possible to observe the spectrogram in a different manner.

By way of example, the noise removal algorithm is a parametric model of a Gamma law, or a statistical model of the "Peaks Over Top" type, or a phase shift model.

The parametric model of a Gamma law is described by Tarassenko et al., in an article entitled "Bayesian Extreme Value Statistics for Novelty Detection in Gas-Turbine Engines", IEEE Aerospace Conference, 2008, pp. 1-11. This model makes it possible to delete the noise generated for example by the combustion, by the air in the conduits, etc. in order to leave only the energy that relates to the rotating parts.

The statistic model of the "Peaks Over Top" type is described by Hazan et al. in the article "Probabilistic outlier detection in vibration spectra with small learning dataset", Mechanical Systems and Signal Processing, 2012. This model is simpler to implement in an onboard calculator as it uses only empirical calculations. It corresponds to a statistical test that makes it possible to see only the zones that exceed a certain level of usual energy.

The phase shift model is described by Klein et al. in "Methods for diagnostics of bearings in non-stationary environment Bearings monitoring", CM & MFPT, 2011, pp. 1-12. This model is a filter that makes it possible to suppress the stationary effects linked to the rotating speed of the shafts.

Figure 4:
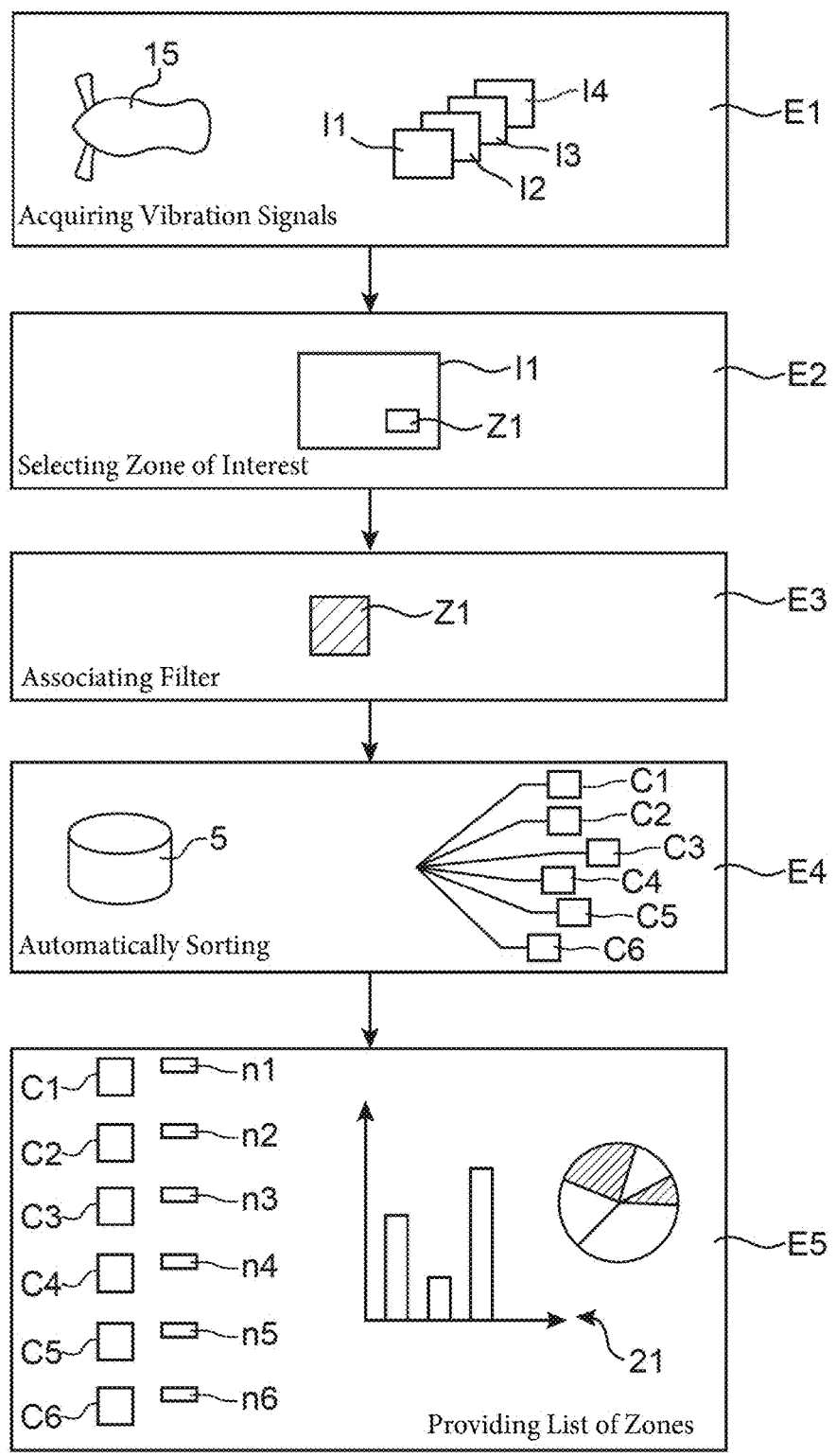
FIG. 4 shows a method for vibration analysis according to a preferred embodiment of the invention.

FIG. 4 shows a method for the vibration analysis according to a preferred embodiment of the invention.

In the step E1, the processing means recover vibration data from the two accelerometers and the rotation speed data from the two shafts of the engine during an acceleration phase followed by a deceleration phase. This data allows the processing means to construct several spectrograms I1-I4. For example, first and second spectrograms I1, I2 can be constructed during the acceleration phase and third and fourth spectrograms I3, I4 can be constructed during the deceleration phase using data measured by the two accelerometers. Other spectrograms can also be constructed according to the inter-shaft rotation speeds (N2−N1 or N2+N1).

In the step E2, the user selects at least one zone of interest Z1 in at least one spectrogram I1. The window selected Z1 corresponds for example to known parts of the spectrogram where certain malfunctions are likely to be observed. A name that represents the defect sought can be associated to each zone of interest selected.

In the step E3, the user can associate to each zone of interest Z1 selected a noise removal filter in order to clean this zone. The user can even associate several filters or very simply omit this step by selecting no noise removal filter.

In the step E4, the processing means automatically sort in the reference database in order to search for each zone of interest Z1 selected, spectrograms comprising zones C1-C6 that resemble the zone of interest Z1 selected by the user.

In the step E5, the processing means provide the user with lists of zones C1-C6 that resemble the zones of interest selected. The lists are displayed on the screen and each list is for example sorted in descending order of similarity and comprises annotations n1-n6 and statistical data 21. Each zone of resemblance has a level of confidence that corresponds to the level of confidence that the expert had in his analysis weighted by the similarity score.

The expert can then read these annotations and the statistical data which can assist him in concluding and can possibly record in the database his own opinion on the zone of interest.

The system according to the invention can as such make it possible to move about or navigate in a space for measuring the vibrations of engines in order to search for similar vibration behaviours by benefiting from a knowledge base that has already been compiled by other experts and which is enriched with each new analysis.

As such, via the successive analyses conducted by the experts a system for graphic representation (nodes and arrows) is built which highlights groups of similar engines according to the masks and scores used. These statistics are in addition greatly improved by the expertise mechanism which allows the user to enter his remarks and to categorise them. The results of the summary obtained are no longer simply calculation elements but also information coming from experts.

The invention claimed is:

1. A method for the vibration analysis of an engine, comprising:
    measuring, by vibration sensors, vibrations of the engine during acceleration and deceleration phases according to low-pressure and high-pressure rotation speeds;
    spectrally acquiring, by a processor, vibration signals from the measuring of the vibrations, the vibration signals relating to the engine in order to form at least one spectrogram that represents an operating state of said engine;
    selecting at least one zone of interest in said at least one spectrogram;
    constructing for each zone of interest a vector of interest that represents said zone of interest by projecting said zone of interest onto an underlying representation space;
    constructing a set of comparison vectors that is representative of a set of corresponding comparison zones with said zone of interest by projecting each one of said comparison zones onto said representation space, said set of comparison zones belonging to annotated spectrograms recorded in a reference database;
    calculating a similarity score between said vector of interest and each one of said comparison vectors for determining a subset of comparison vectors that have a similarity score that exceeds a predetermined level;
    selecting a subset of comparison zones associated to said subset of comparison vectors, said subset of comparison zones having vibration behaviours similar to those of said zone of interest; and
    recovering said subset of comparison zones and annotations associated with said subset of comparison zones.

2. The method according to claim 1, further comprising:
    annotating said zone of interest; and recording in the reference database of said zone of interest, the annotation associated to said zone of interest as well as the spectrogram containing said zone of interest.

3. The method according to claim 1, wherein projecting onto the representation space is carried out according to a projection model or a combination of projection models from among the following models: physical model, learning model, and mathematical model.

4. The method according to claim 1, further comprising displaying a list of said subset of comparison zones diagnosed as being closest to the zone of interest.

5. The method according to claim 4, wherein said list of said subset of comparison zones is sorted in decreasing order of similarity and comprises statistical data and annotations.

6. The method according to claim 1, further comprising cleaning said at least one spectrogram or said at least one zone of interest with a noise removal algorithm.

7. The method according to claim 6, wherein the noise removal algorithm corresponds to a parametric model of a Gamma law, a statistical model, or a phase shift model.

8. The method according to claim 1, wherein each comparison zone is included in a spectral domain that corresponds to a vicinity of the zone of interest.

9. The method according to claim 1, wherein the engine is an aircraft engine.

10. A system for vibration analysis of an engine, said system comprising:
   a processor configured to:
      acquire, from vibration sensors that measure vibrations of the engine during acceleration and deceleration phases according to low-pressure and high-pressure rotation speeds, vibration signals relating to the engine in order to form at least one spectrogram that represents an operating state of said engine,
   select at least one zone of interest in said at least one spectrogram,
   construct for each zone of interest a vector of interest that represents said zone of interest by projecting said zone of interest onto an underlying representation space,
   construct a set of comparison vectors that represent a set of corresponding comparison zones with said zone of interest by projecting each one of said comparison zones onto said representation space, said set of comparison zones belonging to annotated spectrograms recorded in a reference database,
   calculate a similarity score between said vector of interest and each one of said comparison vectors in order to determine a subset of comparison vectors that have a similarity score that exceeds a predetermined level,
   select a subset of comparison zones associated with said subset of comparison vectors, said subset of comparison zones having vibration behaviours similar to those of said zone of interest, and
   display said subset of comparison zones and annotations associated with said subset of comparison zones.

* * * * *